(12) United States Patent
Shiihara

(10) Patent No.: US 10,775,769 B2
(45) Date of Patent: Sep. 15, 2020

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Takeshi Shiihara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 380 days.

(21) Appl. No.: 15/335,137

(22) Filed: Oct. 26, 2016

(65) Prior Publication Data
US 2017/0123407 A1    May 4, 2017

(30) Foreign Application Priority Data
Oct. 30, 2015  (JP) ................................. 2015-215217

(51) Int. Cl.
*G05B 19/4099* (2006.01)
*B29C 64/386* (2017.01)
(Continued)

(52) U.S. Cl.
CPC ........ *G05B 19/4099* (2013.01); *B29C 64/386* (2017.08); *B33Y 10/00* (2014.12);
(Continued)

(58) Field of Classification Search
CPC ........... G05B 19/4099; G05B 19/4083; B33Y 30/00; B33Y 10/00; B33Y 50/02;
(Continued)

(56) References Cited

U.S. PATENT DOCUMENTS

| 5,659,668 A | * | 8/1997 | Misono ................. G06N 5/022 |
| | | | 706/60 |
| 2006/0127153 A1 | | 6/2006 | Menchik |

(Continued)

FOREIGN PATENT DOCUMENTS

| JP | 2007038520 A | 2/2007 |
| JP | 2007185912 A | 7/2007 |
| JP | 2013067018 A | 4/2013 |

OTHER PUBLICATIONS

Hu Ruizhen and Huang Hui, Recent Progress in 3D Printing Inspired Fabrication Optimization, Journal of Computer-Aided Design & Computer Graphics, vol. 27, No. 6, pp. 961-967, Jun. 2015.
(Continued)

*Primary Examiner* — Mouloucoulaye Inoussa
(74) *Attorney, Agent, or Firm* — Canon U.S.A., Inc. IP Division

(57) ABSTRACT

An information processing apparatus according to an exemplary embodiment of the present invention receives an available amount of a consumable material available for use in modeling by a control apparatus configured to model a three-dimensional object using the consumable material, and selects, in a case where a plurality of objects is designated as a modeling target to be modeled by the control apparatus and a setting for the modeling by the control apparatus is designated and a required amount of the consumable material required for the modeling of the plurality of objects by the control apparatus according to the setting is larger than the received available amount, one or more of the plurality of objects as a modeling target such that the required amount of the consumable material required for the modeling by the control apparatus according to the setting is within the available amount.

10 Claims, 16 Drawing Sheets

(51) Int. Cl.
*B33Y 10/00* (2015.01)
*B33Y 30/00* (2015.01)
*B33Y 50/02* (2015.01)

(52) U.S. Cl.
CPC .............. *B33Y 30/00* (2014.12); *B33Y 50/02* (2014.12); *G05B 2219/35134* (2013.01); *G05B 2219/49007* (2013.01); *Y02P 90/265* (2015.11)

(58) Field of Classification Search
CPC ............ B29C 67/0055; B29C 67/0085; B29C 64/307; B29C 64/30; B29C 67/0007; G06T 19/20; G06T 5/002; G06T 7/408; G06T 17/00; G06T 5/20
USPC ............................................. 264/78; 425/113
See application file for complete search history.

(56) References Cited

U.S. PATENT DOCUMENTS

| | | | | |
|---|---|---|---|---|
| 2012/0113457 A1* | 5/2012 | Pettis | ................ | G06F 3/12 358/1.14 |
| 2015/0142153 A1* | 5/2015 | Chun | ................ | B29C 64/40 700/98 |
| 2017/0032580 A1* | 2/2017 | Hemani | ................ | G06T 19/20 |

OTHER PUBLICATIONS

Xu Wenpeng et al.,Topology Optimization for Minimal Volume in 3D Printing, Journal of Computer Research and Development, vol. 52, No. 1, pp. 38-44, Jan. 2015.
Liu Li-Gang et al.,Survey on Geometric Computing in 3D Printing, Chinese Journal of Computers, vol. 38, No. 6, pp. 1243-1267, Jun. 2015.

* cited by examiner

FIG. 4

DEVICE MANAGEMENT TABLE 401

| DEVICE IDENTIFIER | DEVICE NAME | IP ADDRESS | CONNECTION PORT NUMBER |
|---|---|---|---|
| 1 | Device 1 | 192.168.. | 80xx |
| 2 | Device 2 | 192.168.. | 80xx |

MODELING SETTING MANAGEMENT TABLE 402

| MODELING SETTING IDENTIFIER | DEVICE IDENTIFIER | PRINTING SPEED | LAYER THICKNESS | FILLING DENSITY | FILLING PATTERN | SUPPORT STRUCTURE |
|---|---|---|---|---|---|---|
| 1 | 1 | 30mm/sec | 0.10mm | 40% | Rectilinear | On |
| 2 | 2 | 35mm/sec | 0.05mm | 50% | Honeycomb | On |

CONSUMABLE MATERIAL MANAGEMENT TABLE 403

| CONSUMABLE MATERIAL IDENTIFIER | DEVICE IDENTIFIER | TYPE OF CONSUMABLE MATERIAL | AMOUNT OF REMAINING CONSUMABLE MATERIAL |
|---|---|---|---|
| 1 | 1 | ABS-RED | 1500mm |
| 2 | 1 | ABS-BLUE | 3500mm |
| 3 | 2 | ABS-BLUE | 3000mm |

POLICY MANAGEMENT TABLE 404

| POLICY IDENTIFIER | DEVICE IDENTIFIER | APPLICATION CONDITION | FILLING DENSITY OF OBJECT | FILLING PATTERN OF OBJECT | FILLING DENSITY OF SUPPORT STRUCTURE | FILLING PATTERN OF SUPPORT STRUCTURE | OBJECT SCALE | TYPE OF CONSUMABLE MATERIAL |
|---|---|---|---|---|---|---|---|---|
| 1 | 1,2 | WHEN CONSUMABLE MATERIAL IS INSUFFICIENT | 80% | - | 20% | Honeycomb | 90% | ABS-BLUE |

OBJECT DATA MANAGEMENT TABLE 405

| OBJECT IDENTIFIER | OBJECT DATA FILE | FILLING DENSITY OF OBJECT | FILLING PATTERN OF OBJECT | TYPE OF CONSUMABLE MATERIAL | FILLING DENSITY OF SUPPORT STRUCTURE | FILLING PATTERN OF SUPPORT STRUCTURE |
|---|---|---|---|---|---|---|
| A | C:\model\object1.stl | 80% | Rectilinear | ABS-RED | 70% | Rectilinear |
| B | C:\model\object2.stl | 80% | Rectilinear | ABS-RED | 70% | Rectilinear |
| C | C:\model\object3.stl | 80% | Rectilinear | ABS-RED | 70% | Rectilinear |

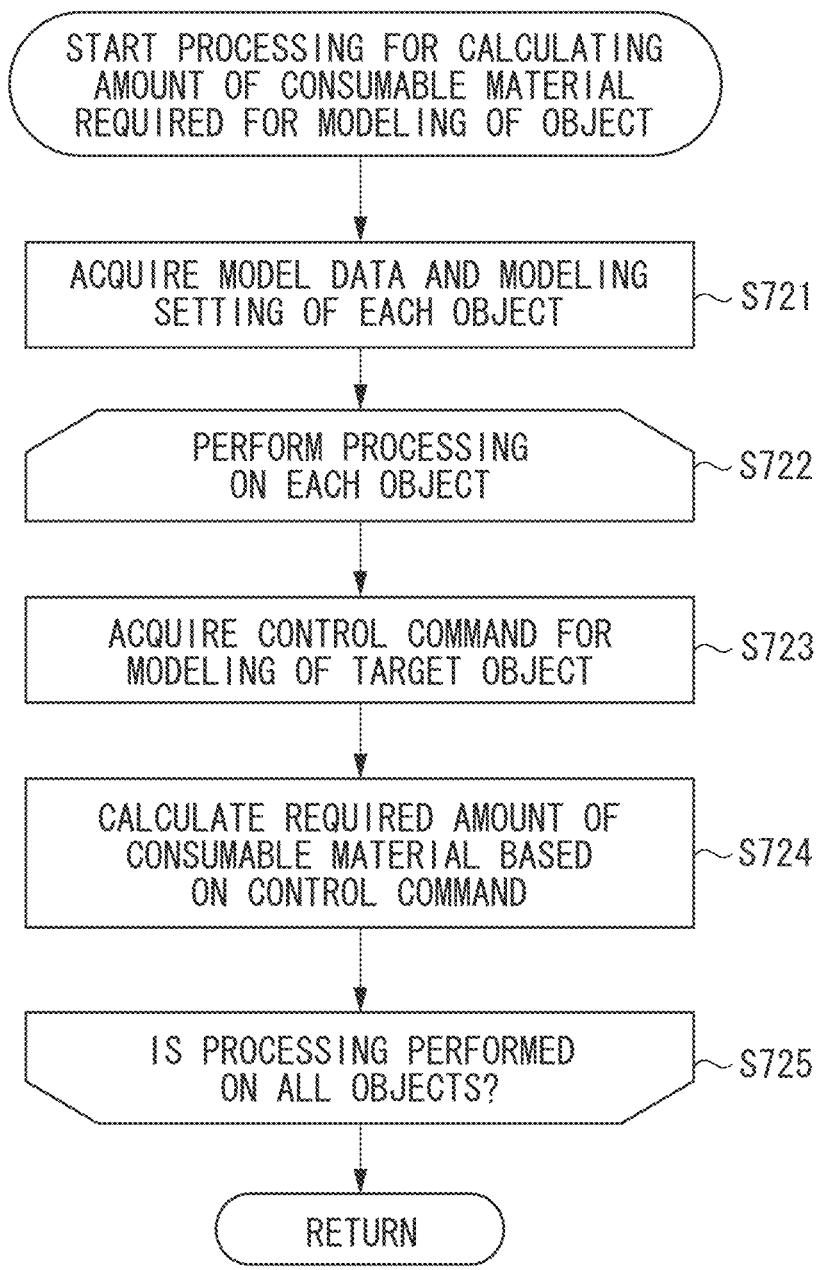

FIG. 10

INFORMATION PROCESSING APPARATUS, CONTROL METHOD, AND STORAGE MEDIUM

BACKGROUND OF THE INVENTION

Field of the Invention

The present disclosure relates to an information processing apparatus on which a client application involved in modeling in a control apparatus configured to perform three-dimensional object modeling runs, a control method, and a storage medium.

Description of the Related Art

A control apparatus configured to perform modeling of a three-dimensional object, which is a solid object, based on model data is generally called a three-dimensional (3D) printer, and use of 3D printers is rapidly increasing in recent years. Technology relating to 3D modeling is also called additive manufacturing. On the other hand, a two-dimensional (2D) printer refers to a printing apparatus configured to perform planar printing on paper (sheet), etc.

Examples of modeling methods of three-dimensional printers include fused deposition modeling (FDM), stereo lithography (STL), selective laser sintering (SLS), and an inkjet method. Consumable materials made from basic materials suitable for the respective modeling methods are used in object modeling. Examples of a system for replenishing a 3D printer with a consumable material include a system in which a dedicated cartridge is attached, a system in which a filament material wound around a core is used, and a system in which a container such as a bottle containing a liquid or powder consumable material is used.

Although 3D printers have existed, they are rarely put on the general market because most of them are large apparatuses for business use, are highly specialized, and are very expensive. However, recent technological innovations have enabled reduction in housing size and improvement in software operability, and products have been developed that are less expensive and can be used by general consumers. Further, corporate 3D printers for business use have improved in performance and decreased in costs compared to conventional printers, so many enterprises are now using 3D printers in the manufacture of prototypes and product parts.

In the above-described modeling in the 3D printers, modeling failure may occur, and there are various possible causes of the failure. One of the causes of the failure is that a consumable material runs out during the modeling. US 20060127153 A1 discusses a method including calculating the amount of a consumable material required for the modeling of an object and prompting a user to replace a cartridge currently used in a 3D printer with a new cartridge if the amount of remaining consumable material in the currently-used cartridge is smaller than the calculated required amount.

Meanwhile, in the above-described modeling in the 3D printers, a time for preparations before the modeling of an object and a time for operations after the modeling are also needed besides the time for the modeling of the object. For example, a preparation time for increasing the temperature of a print head, etc. is needed prior to the modeling, and an operation time for removing the object and eliminating waste liquid is also needed after the modeling. In the case of STL, waste liquid alcohol used to clean a surface of a modeled object needs to be eliminated.

In order to reduce the total time of the modeling of a plurality of objects including the preparation time and the operation time that are needed before and after the modeling, there are cases where the modeling of the plurality of objects is performed successively or concurrently in one modeling instruction. Specifically, there are cases where the modeling of a plurality of objects is performed as a single job executed in a single 3D printer.

Meanwhile, in the cases where the modeling of a plurality of objects is performed as a single job, a larger amount of consumable material is required for the single job, so there is a higher possibility that the consumable material will run out during the modeling. In a 3D printer, an interruption in the modeling as a result of a shortage of a consumable material such as a material during the modeling often affects the quality of a finished product. For example, in the case of FDM, a resin that is a consumable material needs to be fused at a constant temperature and joined, but an interruption in the modeling leads to a temperature difference at the joined portion, and this can cause a crack in the modeled object.

Use of the method discussed in US 20060127153 A1 is expected to prevent an interruption in the modeling due to a lack of a consumable material. However, the modeling of the object cannot be performed until the cartridge replacement is completed, so if a new usable cartridge is not readily available, a significant amount of time is consumed before the start of job execution. Consequently, the modeling of every one of the plurality of objects for which an instruction to perform modeling as a single job is given is delayed. Further, if the cartridge is discarded without using the remaining consumable material in the cartridge, the remaining consumable material in the cartridge is wasted.

SUMMARY OF THE INVENTION

According to an aspect of the present disclosure, art information processing apparatus includes a receiving unit configured to receive an available amount of a consumable material available for use in modeling by a control apparatus configured to model a three-dimensional object using the consumable material, and a selecting unit configured to select, in a case where a plurality of objects is designated as a modeling target to be modeled by the control apparatus and a setting for the modeling by the control apparatus is designated and a required amount of the consumable material required for the modeling of the plurality of objects by the control apparatus according to the setting is larger than the available amount received by the receiving unit, one or some of the plurality of objects as a modeling target such that the required amount of the consumable material required for the modeling by the control apparatus according to the setting is within the available amount.

Further features of the present invention will become apparent from the following description of exemplary embodiments with reference to the attached drawings.

BRIEF DESCRIPTION OF THE DRAWINGS

FIG. 4 illustrates an example of the table configuration in a data management module.

FIG. 5 illustrates an example of control commands generated by a control command generation module.

FIGS. 7A and 7B are flow charts each illustrating an example of a subflow of FIG. 6.

FIG. 10 illustrates an example of a screen UI displaying recommended patterns in the designation of an object to be modeled.

DESCRIPTION OF THE EMBODIMENTS

Various exemplary embodiments, features, and aspects of the disclosure will be described in detail below with reference to the drawings.

In the following exemplary embodiments, a three-dimensional (3D) printer will be described as an example of a control apparatus. While a 3D printer using fused deposition modeling (FDM) will mainly be described in the following exemplary embodiments, the scope of the control apparatus also encompasses 3D printer configured to perform modeling using a method other than FDM, such as stereo lithography and selective laser sintering.

Figure 1:
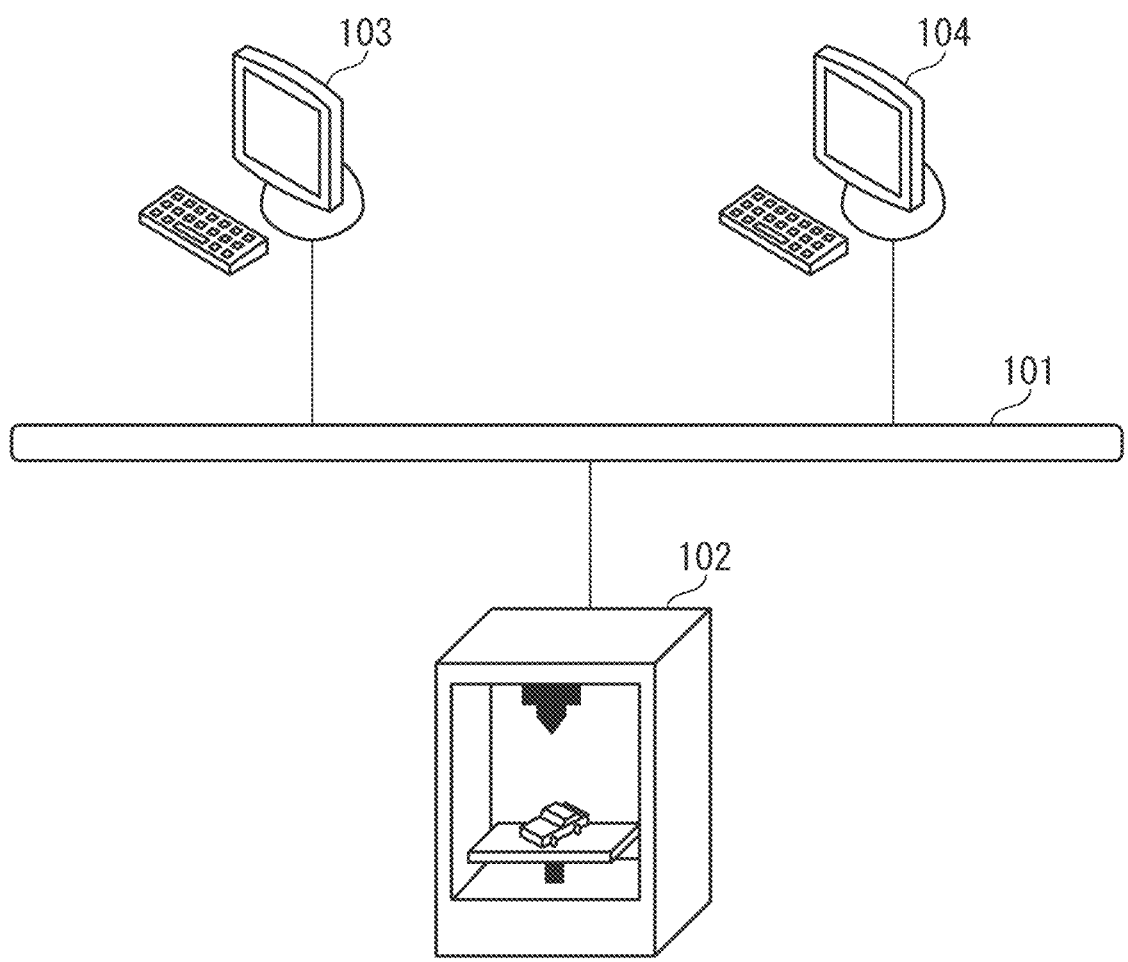
FIG. 1 illustrates an example of the system configuration of a network system according to an exemplary embodiment.

The following describes a first exemplary embodiment. FIG. 1 illustrates an example of the system configuration of a network system according to the present exemplary embodiment.

A network 101 is an intranet, a local area network (hereinafter, "LAN"), etc. A 3D printer 102 is an example of a control apparatus configured to perform modeling of a three-dimensional object to be modeled based on special model data. A computer 103 is a client computer in which modeling control software is installed. A computer 104 is a management server on which a 3D printer management application runs. Examples of the types of the computers 103 and 104 include a personal computer (PC), a tablet computer, and a smartphone.

The 3D printer 102 and the computers 103 and 104 included in a management system according to the present exemplary embodiment can transmit and receive information to and from one another via the network 101. The network 101 may be a wireless network such as a wireless LAN. Further, the network 101 may be a public network such as the Internet via which information can be transmitted and received.

Figure 2:
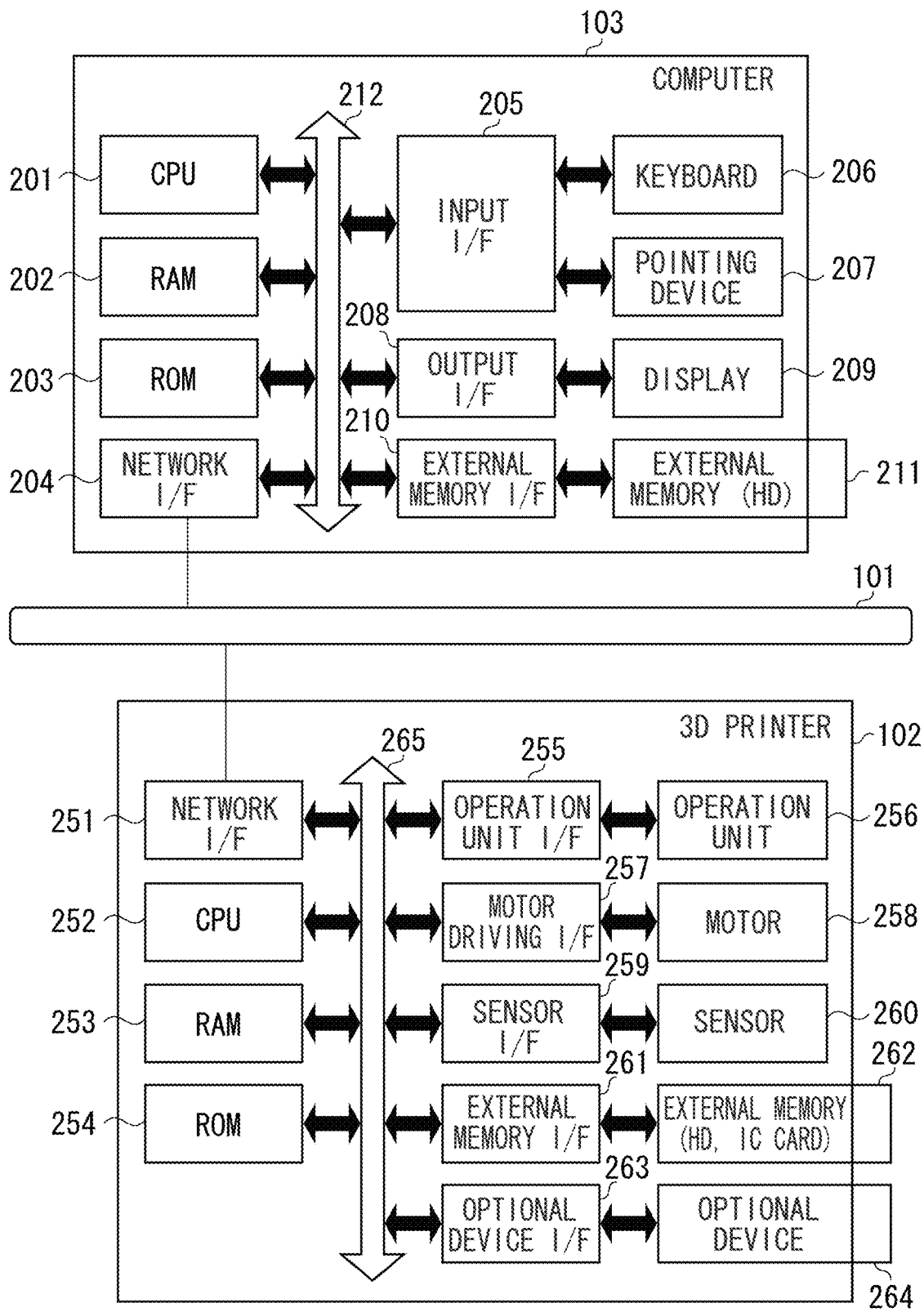
FIG. 2 illustrates an example of the hardware configuration of an information processing function.

FIG. 2 illustrates an example of the hardware configuration of an information processing function of the 3D printer 102 and the computers 103 and 104. The network system includes the computers 103 and 104 and the 3D printer 102 connected together by the network 101. The computers 103 and 104 have the configuration of a general-purpose computer.

In the computer 103, a central processing unit (CPU) 201 executes processing based on an application program, etc. stored in a read-only memory (ROM) 203 or an external memory 211 and comprehensively controls each device connected to a system bus 212. Further, the CPU 201 opens various types of application windows registered based on a command specified by a mouse cursor (not illustrated), etc. on a display 209 and executes various types of data processing.

A random access memory (RAM) 202 functions as a main memory of the CPU 201, a work area, etc. The ROM 203 is a read-only memory that functions as a storage area of a basic input/output (I/O) program, etc. The ROM 203 or the external memory 211 stores therein an operating system program (hereinafter, "OS") that is a control program of the CPU 201, etc. Further, the ROM 203 or the external memory 211 sores files and various types of other data for use in the processing based on the application program, etc.

A network interface (I/F) 204 connects to the network 101 to perform network communication. An input I/F 205 controls input from a keyboard 206 and a pointing device 207 such as a mouse. A display I/F 208 controls a display on the display 209. An external memory I/F 210 controls access to and from the external memory 211 such as a hard disk (HD).

The external memory 211 stores therein a boot program, various types of applications, user files, edit files, etc. The computer 103 operates with the CPU 201 executing the basic I/O program and the OS written to the ROM 203 or the external memory 211. The basic I/O program is written to the ROM 203, and the OS is written to the ROM 203 or the external memory 211. When the computer 103 is turned on, the OS is written from the ROM 203 or the external memory 211 to the RAM 202 by an initial program loading function in the basic I/O program to start operations of the OS. The system bus 212 connects the devices.

In the 3D printer 102, a network I/F 251 connects to the network 101 to perform network communication. A CPU 252 outputs a control signal as output information based on a control program, etc. to a motor 258 via a motor driving I/F 257 connected to a system bus 265. The control program is stored in a ROM 254, an external memory 262, etc. The CPU 252 can perform communication processing with the computer 103 via the network I/F 251 and is configured so as to be capable of notifying the computer 103 of information in the 3D printer 102, etc. Further, the CPU 252 executes processing based on an application program, etc. stored in the ROM 254 or the external memory 262.

A RAM 253 functions as a main memory of the CPU 252, a work area, etc. and is configured such that the memory capacity can be expanded by an optional RAM connected to an expansion port (not illustrated). The RAM 253 is used as an output information development area, an environment data storage area, a non-volatile RAM (NVRAM), etc. The ROM 254 or the external memory 262 stores therein a control program of the CPU 252, application programs, font data for use in the generation of the output information, information for use on the 3D printer 102, etc. Further, the ROM 254 or the external memory 262 temporarily stores therein an application at the time of the installation of the application into the 3D printer 102.

An operation unit I/F 255 serves as an interface to an operation unit 256 and outputs image data to be displayed to the operation unit 256. Further, the operation unit I/F 255 receives information input by a user via the operation unit 256. The operation unit 256 corresponds to art operation panel, etc. provided with a switch, a light emitting diode (LED) display unit, etc. for operations. A motor driving I/F 257 outputs an image signal as output information to a motor 258 (printer engine). A sensor I/F 259 receives a signal as input information from a sensor 260 (temperature sensor, vibration sensor, object identification sensor, etc.). Further, the sensor 260 includes a sensor configured to detect the amount of remaining consumable material in a cartridge set to the 3D printer 102.

A cartridge configured to store a consumable material may be a replaceable cartridge, or the cartridge may be replenished with an additional consumable material. The cartridge configured to store a consumable material does not have to include a detection unit configured to detect attachment of the cartridge to the 3D printer 102. Further, as to examples of how a consumable material is stored in a cartridge, a material in the form of a filament may be wound around a core, or a liquid or powder consumable material may be stored in a container such as a bottle.

An external memory I/F (memory controller) 261 controls access to the external memory 262 such as a HD and an integrated circuit (IC) card. Further, the number of the external memory 262 described above is not limited to one, and at least one external memory may be included so that a plurality of optional font cards in addition to a built-in card and a plurality of external memories storing programs for interpreting printer control languages of different language systems can be connected. Further, a NVRAM (not illustrated) may be included to store printer mode setting information from the operation unit 256.

An optional device I/F 263 controls access to an optional device 264. Examples of the optional device 264 include ancillary facilities that are required depending on the modeling method and peripheral devices such as a camera and an IC card reader for expanding the functions and mechanisms of the 3D printer 102. Examples of the ancillary facilities include an apparatus needed as a countermeasure against powder in the case of the inkjet method and a cleaning apparatus needed in the case of SLA. The system bus 265 connects the devices.

Figure 3:
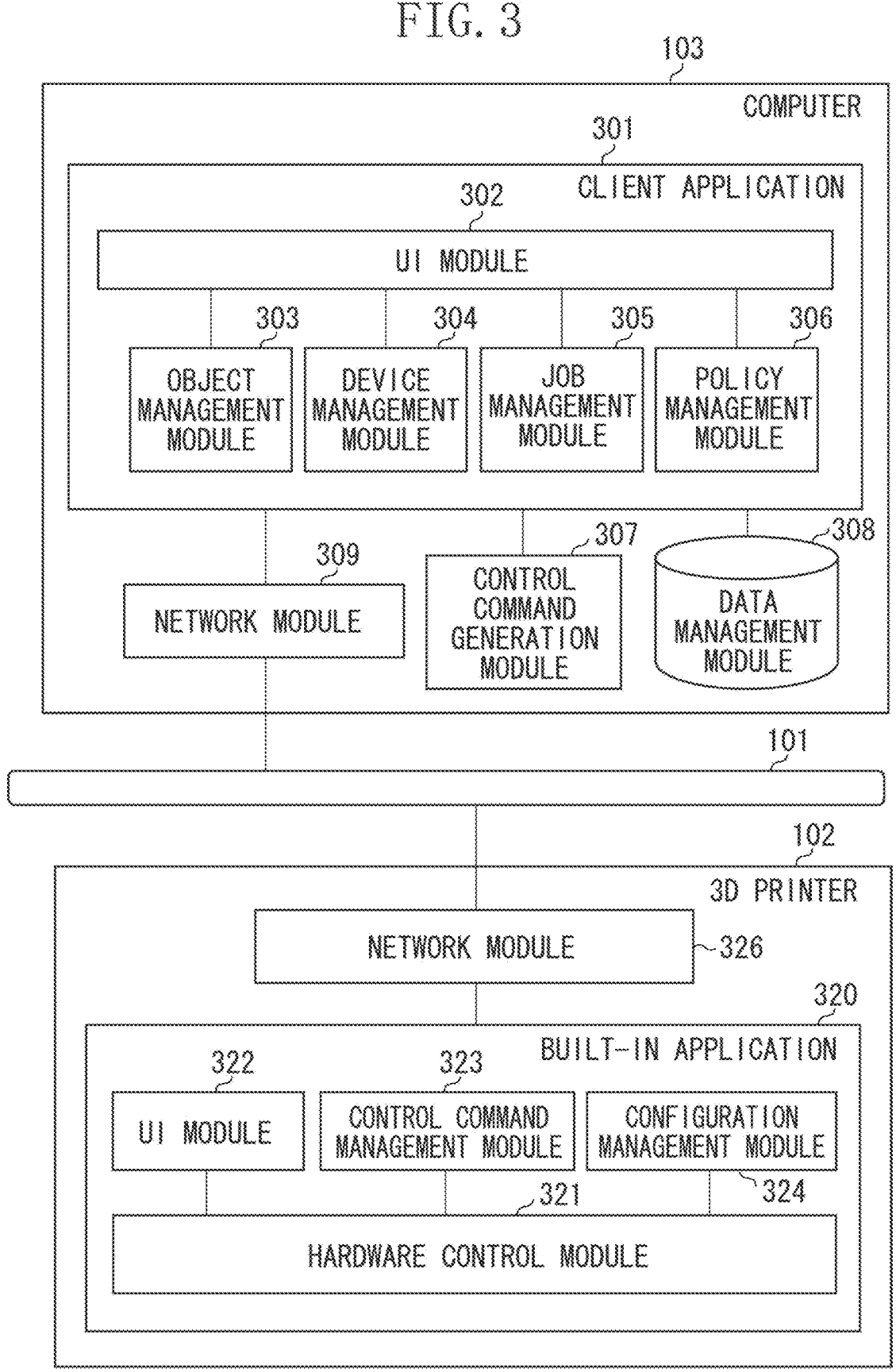
FIG. 3 illustrates an example of the software configuration of a network system.

FIG. 3 illustrates the software configuration of the network system. The following describes the software configurations of the 3D printer 102 and the computer 103, which communicate with each other via the network 101, with reference to FIG. 3.

First, the following describes the software configuration of the computer 103. In the computer 103, a client application 301 and each module exist as files stored in the external memory 211. These are program modules that are loaded into the RAM 202 and executed by the OS or a module using the modules at the time of execution.

Further, the client application 301 can add to a compact disk read only memory (CD-ROM) (not illustrated) of the external memory 211 or to a HD of the external memory 211 via a network 270. A network module 309 performs network communication with the 3D printer 102 and another computer 104 using a predetermined communication protocol. An information processing apparatus on which the client application 301 runs may be an information processing apparatus other than the computer 103. For example, the information processing apparatus may be a computer embedded in the 3D printer 102 or the computer 104 on which the 3D printer management application runs.

A UI module 302 is a module in the client application 301 that provides a graphical interface to a user. For example, the UI module 302 activates an application window, draws 3D model data, and displays various setting screens. Besides the foregoing, the UI module 302 may provide an interface for operating an application according to a protocol such as the Hypertext Transfer Protocol (HTTP) in response to an external request via the network 101 and the network module 309. The graphical user interface (GUI) may be provided to the user using any other ways. Further, the UI module 302 calls and executes various modules to provide various functions to the user.

Examples of modules to be called by the UI module 302 include an object management module 303, a device management module 304, a job management module 305, and a policy management module 306. Further, the UI module 302 may call a module other than the foregoing modules.

The object management module 303 is a module configured to manage object data (3D model data) input via the UI module 302. Examples of a file format of the object data include a standard triangulated language (STL) format. The STL format is a file format for storing data representing a three-dimensional shape and is often used as a file format of 3D model data. The file format of the object data may be any file format other than the STL format, for storing data that can represent a three-dimensional shape.

The device management module 304 searches for the 3D printer 102 connected to the computer 103 via the network 101 using a predetermined communication protocol. Examples of a communication protocol used in the search by the device management module 304 include the Internet Printing Protocol (IPP) and Web Services Dynamic Discovery (WS-Discovery).

Besides the foregoing communication protocols, other communication protocols may be used such as. Simple Network Management Protocol (SNMP) and Service Location Protocol (SLP). The device management module 304 searches for the 3D printer 102, acquires modeling setting information, modeling performance information, the amount of remaining consumable material, etc. from the 3D printer 102, and stores the modeling setting information, the modeling performance information, the amount of remaining consumable material, etc. in a data management module 308 described below.

The job management module 305 generates and manages a job including a control command generated based on the object data received by the UI module 302 and the object management module 303 and the modeling setting information received by the device management module 304. The control command is generated based on the object data and the modeling settings by a control command generation module 307 described below. The generated job is transmitted to the 3D printer 102 via the network module 309 and the network 101. Further, the job management module 305 analyzes the control command and calculates the amount of consumable material needed to be used in the modeling in the 3D printer according to the modeling settings. Based on the information about the calculated amount to be used, whether the job is executable is determined. The job management module 305 may be capable of executing an operation besides the job transmission and the determination as to whether a job is executable. For example, the date and time of job execution may be specified on a schedule to make a reservation for the job execution.

The policy management module 306 changes the job modeling settings generated by the job management module 305 according to an application condition designated by a policy. Items of the modeling settings include a filling density of object, a filling pattern, a scale, and a type of consumable material. Alternatively, other setting information that is a setting about 3D printer modeling may be used. Predetermined modeling settings are applied if the predetermined condition designated by the policy is satisfied.

The data management module 308 manages various types of data and files and stores and retrieves data in response to a request from other modules. The data management module 308 may be on an apparatus that is different from the computer 103 and is accessible from the client application 301. The data managed by the data management module 308 will be described later with reference to FIG. 4.

The control command generation module 307 is a modeling control software module installed and executed in the computer 103. A slicer converts object data into a command format that is executable by the 3D printer 102. For example, the STL format, which is a file format for storing data representing a three-dimensional shape, is converted into a G-code, which is an expanded format of a command of a machine tool for 3D printers. The control command generation module 307 may be implemented in the client application 301.

Next, the following describes the software configuration of the 3D printer 102.

In the 3D printer 102, various types of modules exist as files stored in the ROM 254 or the external memory 262, and at the time of execution, the files are loaded into the RAM 253 and executed. A network module 326 performs network communication with the computer 103 using a predetermined communication protocol. A built-in application 320 is an application that is loaded into the RAM 253 and executed. The built-in application 320 includes a group of modules such as a hardware control module 321, a UI module 322, a control command management module 323, and a configuration management module 324, which will be described below. Further, a module necessary for the 3D printer to perform modeling may be included.

The hardware control module 321 controls various types of driving components of the 3D printer and acquires values from various sensors (not illustrated) such as a temperature sensor and a vibration sensor. The hardware control module 321 receives control commands relating to the modeling from the UI module 322, the control command management module 323, and the configuration management module 324 and transmits feedback information such as a sensor value to the respective modules. The control relating to the modeling is not limited to the foregoing examples.

The UI module 322 is a module that outputs information about the 3D printer modeling to the operation unit 256 of the 3D printer 102 and receives input of control commands and various types of setting value information. For example, the UI module 322 outputs progress information about the modeling to a panel attached to the 3D printer 102 and displays details of an error when the error occurs. Further, the UI module 322 may receive processing of changing a setting value of the 3D printer 102 via a panel screen, buttons, etc. Besides the foregoing processing, the UI module 322 may perform processing to receive a control command via an external memory such as a universal serial bus (USB) memory or may provide a UI of the 3D printer 102 to an external apparatus via the network module 326 using a web protocol such as HTTP protocol. The input and output of information about the modeling are not limited to the foregoing examples.

The control command management module 323 is a module configured to receive, manage, and execute a control command transmitted from the client application 301. The control command management module 323 stores, changes, or removes a control command contained in job data transmitted from the client application 301 and manages information about a job. For example, the control command management module 323 updates progress information (start, end, error, etc.) about a plurality of jobs received from the client application 301, reads control commands, and operates various types of driving components via the hardware control module 321, thereby managing the actual modeling processing. Further, the machine performance of the 3D printer 102 may include the function of the control command generation module 307 of the client application 301 to convert object data into a control command on the 3D printer 102 and manage and execute the generated control command. The control relating to the control command management is not limited to the foregoing examples.

The configuration management module 324 manages hardware configuration information and software configuration information about the 3D printer 102 and state information about various types of consumable materials and components. Examples of hardware configuration information include unique information about the 3D printer 102 such as a product number and a manufacturing plant identifier of the 3D printer 102, production information about an optional device connected to the 3D printer 102, and the usage state of the optional device. Examples of the optional device include a finisher and a cassette unit. In a case where consumable/wearable items such as a consumable material and a hinge are used inside an optional device, the configuration management module 324 also acquires the consumption and wear states of the items and notifies the client application 301 of the acquired consumption and wear states via the network module 326 and the network 101. Examples of software configuration information include firmware information about the 3D printer 102 and information about an installed application. Further, the configuration management module 324 may receive a firmware update request transmitted from the client application 301 to execute updating of firmware of the 3D printer 102 and installation of an application.

FIG. 4 illustrates an example of the table configuration in the data management module 308. The table configuration illustrated in FIG. 4 is a mere example, and a table configuration different from the illustrated example may be employed.

A device management table 401 is a table configured to manage information about the 3D printer 102 managed by the client application 301. Examples of information managed by the device management table 401 include a device identifier, a device name, an Internet Protocol (IP) address, and a connection port number.

As used herein, the device identifier refers to an identifier for uniquely identifying the 3D printer 102. The device name is a predetermined name by which the 3D printer 102 can be identified. The IP address and the connection port number are address information for connecting to the 3D printer 102 to transmit a job and acquire state information.

A modeling setting management table 402 is a table configured to manage information about modeling settings associated with respective pieces of 3D printer information. Examples of information managed by the modeling setting management table 402 include a modeling setting identifier, a device identifier, a printing speed, a layer thickness, a filling density, a filling pattern, and a support structure.

As used herein, the modeling setting identifier refers to an identifier for uniquely identifying a modeling setting. The printing speed is the modeling speed of the 3D printer 102. For example, in a case of a FDM 3D printer, the speed of expulsion of consumable material (filament material) under pressure is used as the modeling speed. The layer thickness is the thickness (pitch width) per layer. With a smaller value of the layer thickness, a modeled object with a smoother surface is obtained. The filling density is the filling density of modeled object. With a higher filling density, the density inside a modeled object increases to increase the strength, but the amount of consumable material used also increases.

The filling pattern is the shape of an internal configuration of a modeled object. Examples of filling patterns include a rectilinear shape, a concentric shape, a honeycomb shape, and a Hilbert curve. The strength and elasticity of a modeled object can be adjusted by adjusting the filling pattern.

The support (support structure) is an object (e.g., support pillar) that is modeled as a support in the modeling as needed. In a case where the modeling of a support structure is enabled ("on"), a support structure serving as a support at a material output area is modeled as needed. The modeling of a support enables obtaining of a modeled object with reduced distortion. A support control command is generated based on the configuration of an object by the control command generation module 307. Specifically, information about a support is not contained in object data, and when the object data is converted into a control command, information about the modeling of the support is added to an object control command. The filling density, the filling pattern, and the support may be configurable with respect to all objects contained in a job or may be configurable with respect to one or some of the objects. Further, the filling density and the filling pattern may be configurable only with respect to a support portion.

A consumable material management table 403 is a table configured to manage consumable material information about the 3D printer 102. Examples of information managed by the consumable material management table 403 include a consumable material identifier, a device identifier, a type of consumable material, and an amount of remaining consumable material.

As used herein, the consumable material identifier refers to an identifier for uniquely identifying consumable material information associated with the 3D printer 102. The type consumable material is information indicating the type of consumable material such as a basic material and color. A basic material of a consumable material to be used differs depending on the modeling method. For example, in FDM, a consumable material such as acrylonitrile-butadiene-styrene (ABS) resin or polylactic acid (PLA) resin is used. Further, there are cases where a support uses a water-soluble consumable material. Further, in a case of modeling using a special powder material such as plaster and an adhesive, the adhesive used in the modeling is also a consumable material.

The amount of remaining consumable material is the amount of remaining consumable material in the 3D printer 102. The type of consumable material and the amount of remaining consumable material are acquired from the configuration management module 324 of the 3D printer 102 by the device management module 304. The type of consumable material and the amount of remaining consumable material in the 3D printer 102 may be acquired by any other ways.

A policy management table changes the modeling settings for a job generated by the job management module 305 according to the application condition designated by the policy. Examples of information managed by the policy management table 404 include a policy identifier, a device identifier, an application condition, a filling density and a filling pattern of an object, a filling density and a filling pattern of a support structure, an object scale, and the type of consumable material. For example, the policy management table 404 specifies that the filling density of an object is set to 80% when a consumable material is insufficient.

As used herein, the policy identifier refers to an identifier for uniquely identifying the policy. The application condition is a condition under which the policy is applied. For example, a condition is designated such as the amount of remaining consumable material, the time and date, and whether to apply the policy to other applications and a specific event of the 3D printer 102. Alternatively, a condition other than the foregoing conditions may be designated. The filling density of an object is a set value of a filling density per object. The filling pattern of an object is a set value of a filling pattern per object. The filling density of a support is a filling density that is set only to a support excluding an object. The filling pattern of a support is a filling pattern that is set only to a support excluding an object. The object scale is a scale of an object. An amount of change from an original scale of an object may be designated as the object scale, or any other designating method may be used.

An object data management table 405 is a table configured to manage object data. Examples of information managed by the object data management table 405 include an object identifier, a object data file, a filling density of an object, a filling pattern of the object, the type of material used, a filling density of a support, and a filling pattern of the support.

As used herein, the object identifier refers to an identifier for uniquely identifying object data. In the column of the object data file, file paths each in which a file of object data is stored are described. The material to be used refers to the type of consumable material used in the modeling of an object. Description of FIG. 4 ends here.

Figure 5:
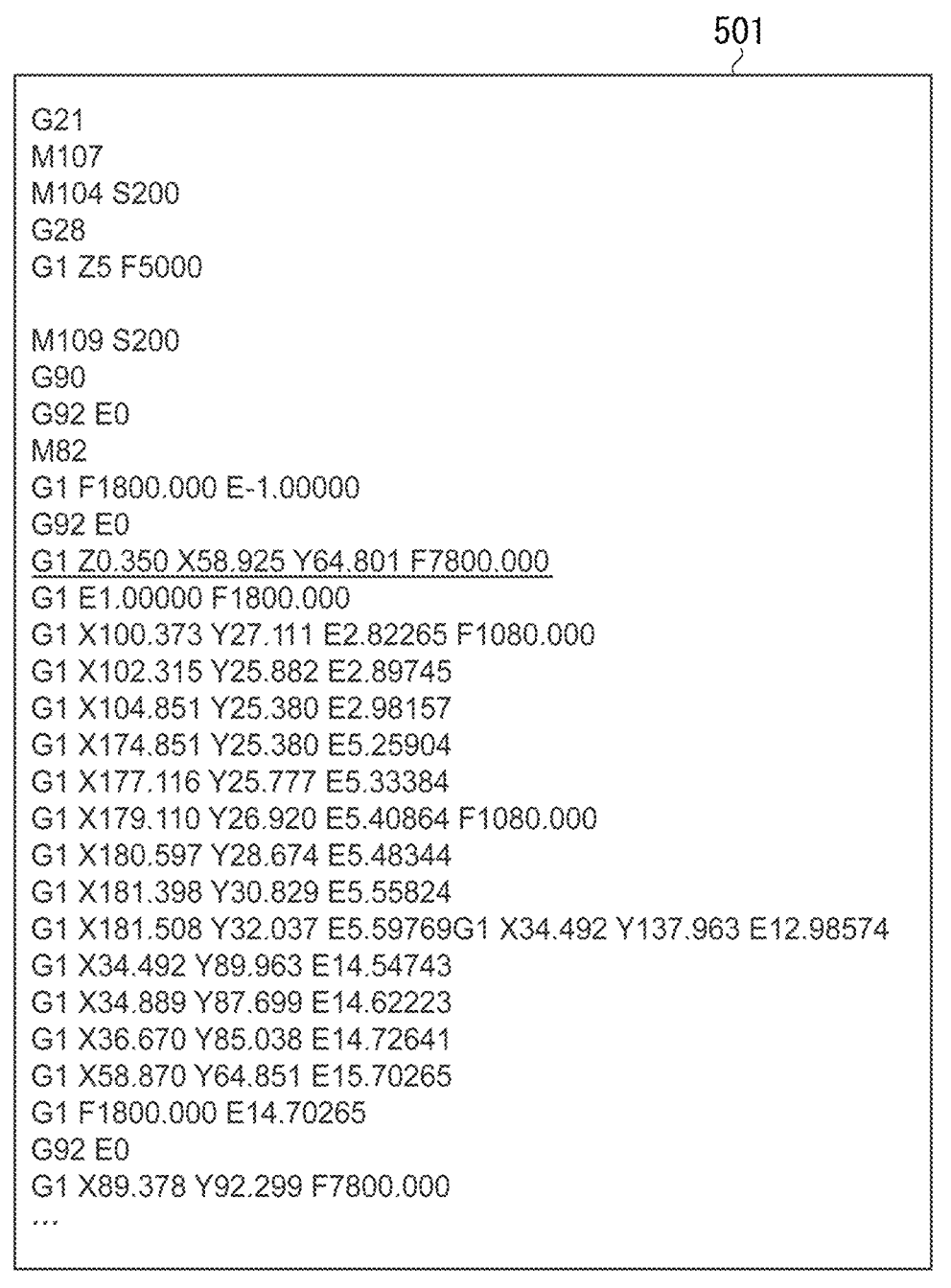

FIG. 5 illustrates an example of control commands generated by the control command generation module 307. FIG. 5, G-code descriptions are illustrated as an example of control commands. Alternatively, the control commands may be in any other format.

Control commands 501 are a file in text format in which a control command for the 3D printer 102 is described in each line. The 3D printer 102 acquires the control commands line by line and performs modeling according to the commands. Examples of information contained in the control commands 501 include coordinate information about the movement of a print head, the amount of consumable material to be used (in the case of FDM, the length of expulsion of a filament under pressure, etc.), a stacking pitch, and a head temperature. The coordinates of the movement of the print head are designated in X-axis, Y-axis, and Z-axis directions. For example, commands are described that designate X and Y coordinates indicating the print head movement corresponding to one layer and order the print, head to move along the Z-axis at the completion of stacking of the layer to perform stacking of a next layer. The movement along the Z-axis is realized by, for example, moving the print head in the Z-axis direction or moving a build plate upward and downward.

Figure 6:
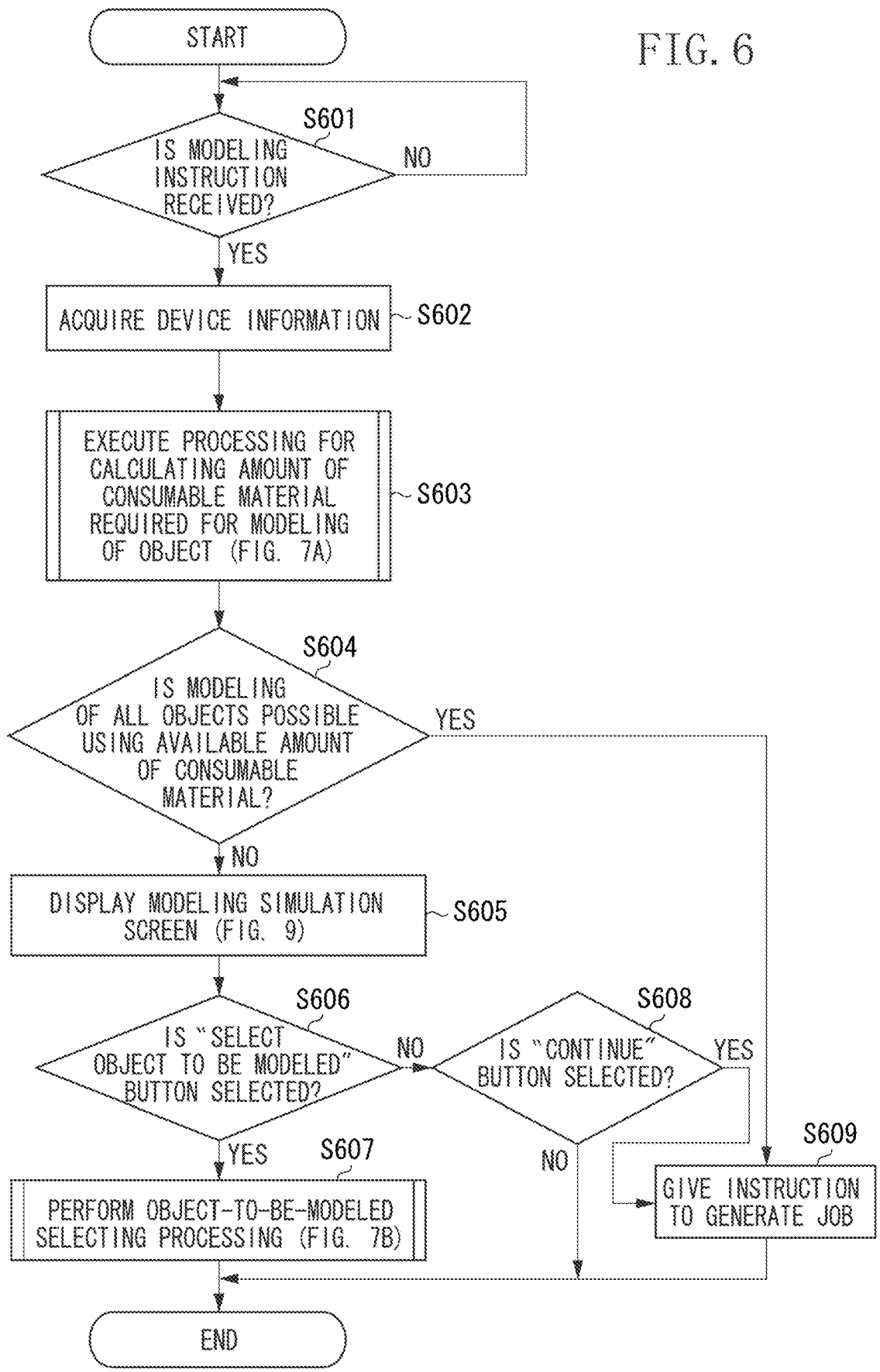
FIG. 6 is a flow chart illustrating an example of a process performed by a client application.

FIG. 6 is a flow chart illustrating a process performed by the client application 301. The process is executed by the client application 301 before a job to be executed by the 3D printer 102 is generated. When it is impossible to perform modeling of a plurality of objects using a consumable material available for use, one or some of the plurality of objects are designated as a modeling target.

In step S601, if it is determined that the UI module 302 receives a modeling instruction (YES in step S601), the processing proceeds to step S602.

The modeling instruction contains object data specifying a modeling target and information about device settings and modeling settings. The object data is 3D model data in STL format, etc. Examples of a method of receiving object data include a method in which a file is imported from the GUI screen of the client application 301 and a method in which a file is imported from an external application via a network. The received object data is stored in the object data management table 405 of the data management module 308.

There may be a case where the shape, scale, etc. of an object of the received object data are changed by an operation on the GUI screen of the client application 301. Further, there may be a case where the device settings and modeling settings of the 3D printer 102 are changed. The device settings are, for example, the control apparatus connection settings stored in the device management table 401 of the data management module 308. The modeling settings include, for example, the setting items such as the printing speed of the 3D printer 102, the layer thickness, the filling density, the filling pattern, and the support stored in the modeling setting management table 402 of the data management module 308 and values for the setting items. In the case where a change is made in the object shape and the object scale or the device settings and the modeling settings, the modeling instruction received in step S601 contains the contents of the changed data and the changed settings.

Figure 8:
FIG. 8 illustrates an example of an input screen user interface (UI) for modeling settings.

FIG. 8 illustrates an example of a modeling setting input screen UI. A window 801 is a window of a modeling setting input screen provided by the client application 301. A pull-down menu 802 is a pull-down menu for selecting a 3D printer. An item 803 is an item for setting a printing speed value (ram/sec). An item 804 is an item for setting a layer thickness (pitch width) value (mm). An item 805 is an item for setting a filling density value (%). A pull-down menu 806 is a pull-down menu for setting a filling pattern. An item 807 is an item for setting whether to include a support structure. A button 808 is a button for saving the set values. If the UI module 302 detects the press of the button 808 for saving, the UI module 302 stores the set values in the data management module 308. If set values for the 3D printer are already stored, the existing set values are updated. Description of FIG. 8 ends here.

The following is a continuation of the description of the flow chart illustrated in FIG. 6.

In step S602, the device management module 304 which includes a function as a receiving unit in the exemplary embodiments acquires device information from the 3D printer 102. Specifically, the device management module 304 acquires connection information about the 3D printer 102 from the device apparatus management table 401 of the data management module 308. Then, the device management module 304 connects to the 3D printer 102 using the acquired connection information and acquires the latest device information including modeling setting information, modeling performance information, and the amount of remaining consumable material from the configuration management module 324 of the 3D printer 102. The device management module 304 stores the various types of acquired information about the 3D printer 102 in the data management module 308. The amount of remaining consumable material that is acquired in step S602 will be used as the amount of consumable material available for use in the modeling in subsequent processing.

Alternatively, the device management module 304 may display a screen for inputting device information via the UI module 302. For example, when the amount of remaining consumable material in the 3D printer 102 is not successfully acquired in step S602, a screen for inputting the amount of remaining consumable material may be displayed so that a user can input a value. Further, the available amount of consumable material may include not only the amount of remaining consumable material in a usable cartridge attached to the 3D printer, which is the amount acquired as device information, but also the amount of consumable material in a spare cartridge available for replacement.

In step S603, the job management module 305 calculates the amount of consumable material required for the modeling of each object.

The following describes details of the processing for calculating the amount of consumable material required for the modeling of each object, with reference to a subflow illustrated in FIG. 7A.

In step S721, the job management module 305 acquires model data of each object and modeling setting information from the modeling setting management table 402 and the object data management table 405 of the data management module 308.

In steps S722 to S725, the processing of steps S723 and step S724 is performed on each object. When the processing is performed on all the objects, the loop is ended.

In step S723, the job management module 305 acquires a control command generated by the control command generation module 307 based on the model data and the modeling setting information acquired in step S721.

In step S724, the required amount of consumable material is calculated based on the object control command generated in step S723.

The job management module 305 calculates the amount of consumable material to be used in the modeling for each layer based on the control command and then sums up all the calculated amounts. For example, the Z-axis movement specified by the control command may be determined as a movement to another layer, and the amount of consumable material to be used for one layer can be calculated from the amount of XY movements in a predetermined Z-axis and the length of expulsion of the consumable material (filament) under pressure.

By the foregoing subflow, the amount of consumable material required for the modeling of each object can be calculated.

The following is a continuation of the description of the flow chart illustrated in FIG. 6.

In step S604, the job management module 305 compares the available amount of consumable material that is acquired in step S602 with the required amount of consumable material that is acquired in step S603, and determines whether the modeling of all the objects designated by the modeling instruction received in step S601 is possible if the required amount is larger than the available amount, a shortage of the consumable material will occur during the modeling, so it is determined that the modeling is impossible NO in step S604), and the processing proceeds to step S605. On the other hand, if it is determined that the modeling is possible (YES in step S604), the processing proceeds to step S609.

Figure 9:
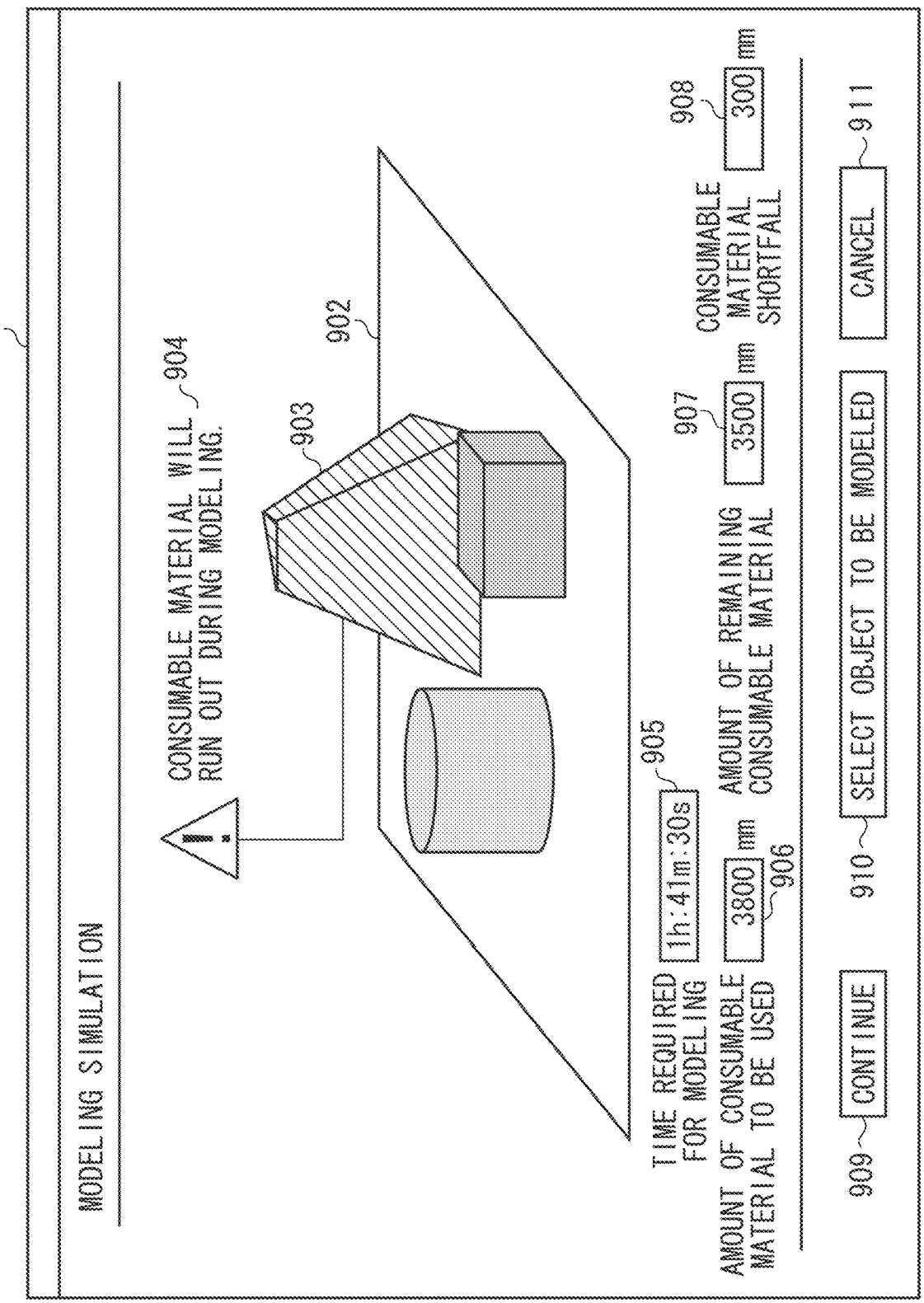
FIG. 9 illustrates an example of a display screen UI for modeling simulation.

In step S605, a modeling simulation screen is displayed to notify the user that the modeling is impossible. For example, a modeling simulation display screen UI illustrated in FIG. 9 is displayed. A window 901 is a window of a screen for the simulation of the modeling of the job. A build plate 902 represents the build plate of the 3D printer 102 in 3D. Modeling target objects are arranged on the build plate in 3D to perform a simulation of the modeling by the 3D printer 102. An object 903 is an object as to which it is determined that a shortage of the consumable material will occur during the modeling. An item 904 displays a notification that the modeling will fail and also displays details of the failure. At this time, the object 903 may be emphasized by changing the color, the edge, the display pattern, etc. to make it easy to distinguish the object 903 from an object that can be modeled. An item 905 indicates the time needed for the modeling from the start of the job to the completion of the modeling. An item 906 indicates the required amount of consumable material to be used for the modeling of the job. An item 907 indicates the amount of remaining consumable material in the 3D printer 102. An item 908 indicates a consumable material shortfall.

Based on a result of the modeling simulation as illustrated in FIG. 9, the user selects one of the following. To continue the job, the user can select a "continue" button 909. To designate one or some of the plurality of modeling target objects, the user can select a "designate object to be modeled" button 910. To cancel the modeling, the user can select a "cancel" button 911.

In step S606, if it is determined that the "designate object to be modeled" button 910 is selected (YES in step S606), the processing proceeds to step S607. In step S607, the job management module 305 performs object-to-be-modeled selecting processing.

Figure 7B:
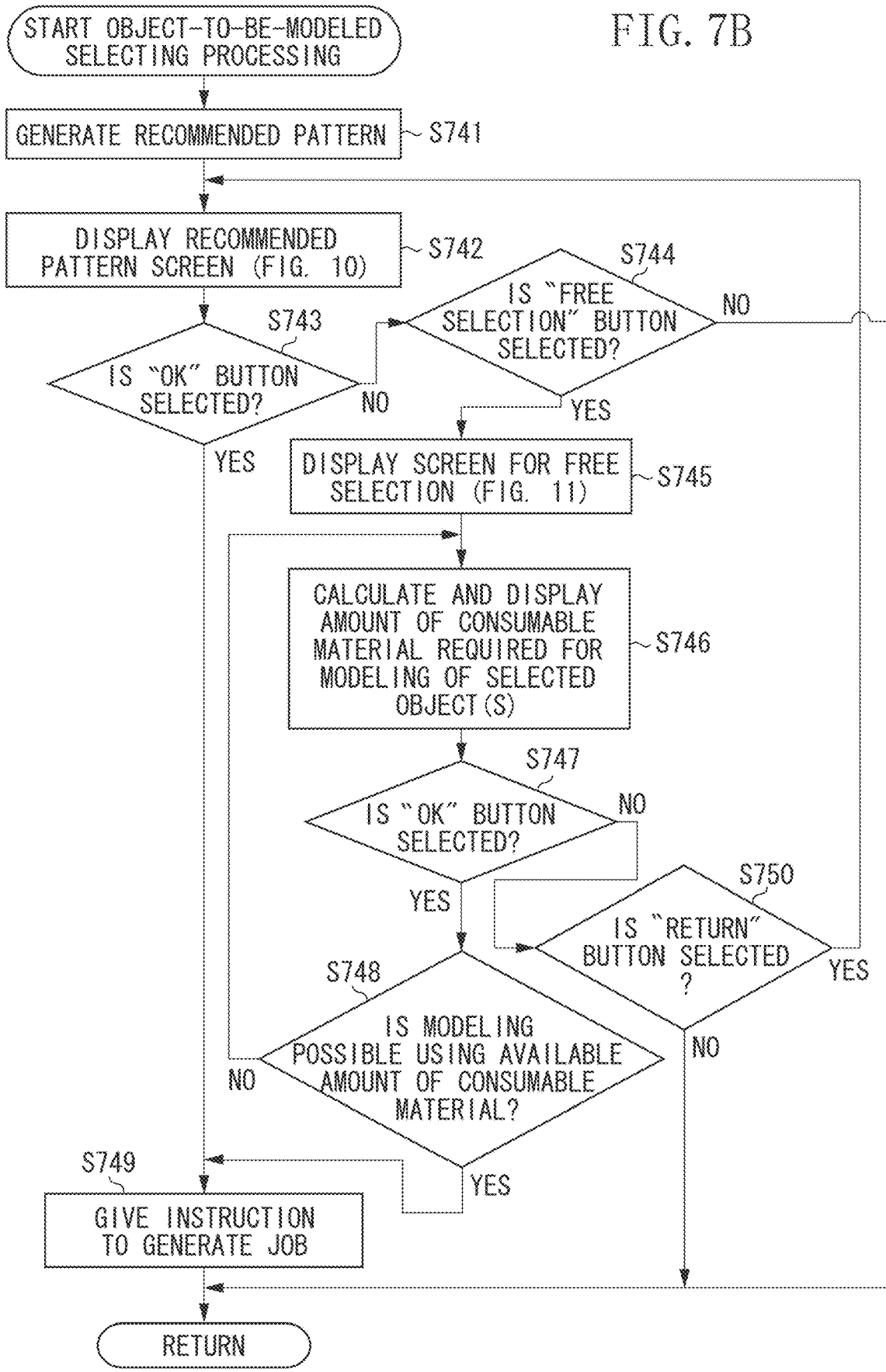

The following describes details of the object-to-be-modeled designating processing with reference to a subflow illustrated in FIG. 7B.

In step S741, the job management module 305 generates a recommended pattern for the designation of an object to be modeled. Specifically, based on the required amount of consumable material for the modeling of each object that is calculated in step S603, an object that can be modeled using the modeling settings contained in the modeling instruction received in step S601 is designated, and a pattern of a combination of the designated objects is generated.

In step S742, the job management module 305 displays via the UI module 302 the recommended pattern generated in step S741.

Figure 10:
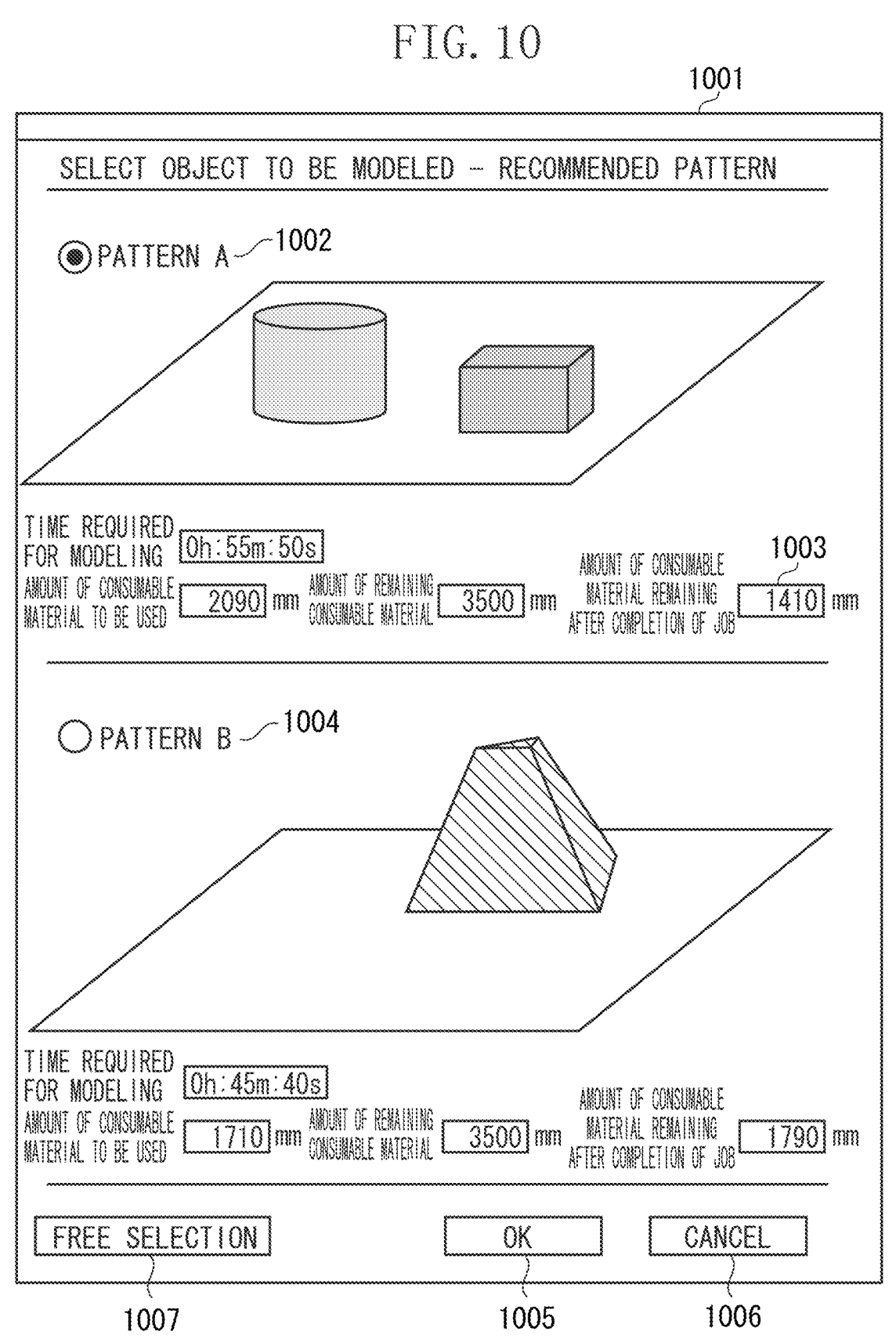

FIG. 10 illustrates an example of a screen UI displaying recommend patterns in the designation of an object to be modeled. A window 1001 is a window of a screen displaying recommended patterns. In FIG. 10, two candidates for a combination of objects determined as objects that can be modeled, among the plurality of objects contained in the original job are displayed. The combination candidates provided in step S742 are not limited to two candidates and may be three or more candidates, all candidates, or only one candidate. Buttons 1002 and 1004 are selection buttons for selecting one of the combination candidates as a modeling target.

In FIG. 10, a pattern A 1002 is an example showing a combination of a plurality of (two) objects as a candidate. The user can recognize the combination of the plurality of objects specified by the pattern A that can be modeled using the consumable material available for use. An item 1003 indicates the amount of remaining consumable material that remains after the completion of the job. A button 1005 is an "OK" button for determining the modeling in the selected pattern. A button 1006 is a "cancel" button for cancelling the modeling. The user compares information provided by the recommended patterns, such as the time required for the modeling and the amount of consumable material to be used, and designates a pattern that includes an object the modeling of which is prioritized based on the priority of the object and the stock status of the consumable material. A button 1007 is a "free selection" button for designating an object by the combination other than the combinations displayed as the recommended patterns. If the "free selection" button 1007 is selected, the screen is changed to a free selection screen illustrated in FIG. 11 described below. Further, an unselected object may be reserved as a job to be executed afterward in the 3D printer 102.

Alternatively, the client application 301 may select one of the modeling targets from the combination candidates specified by the patterns A 1002 and B 1004 and present the selected modeling target to the user.

In step S743, whether the "OK" button 1005 is selected by an operation on the screen illustrated in FIG. 10 is determined. If the "OK" button 1005 is selected (YES in step S743), the processing proceeds to step S749, and an instruction to generate a job of the selected recommended pattern is given.

In step S744, whether the "free selection" button 1007 for enabling the user to freely select an object to be modeled is selected by an operation on the screen illustrated an FIG. 10 is determined. If the "free selection" button 1007 is selected (YES in step S744), the processing proceeds to step S745. On the other hand, if the "free selection" button 1007 is not selected in step S744 (NO in step S744), i.e., if the "cancel" button 1006 is selected, the job management module 305 does not give an instruction to generate the job, and the processing returns to FIG. 6.

In step S745, the job management module 305 displays via the UI module 302 a screen for free selection.

Figure 11:
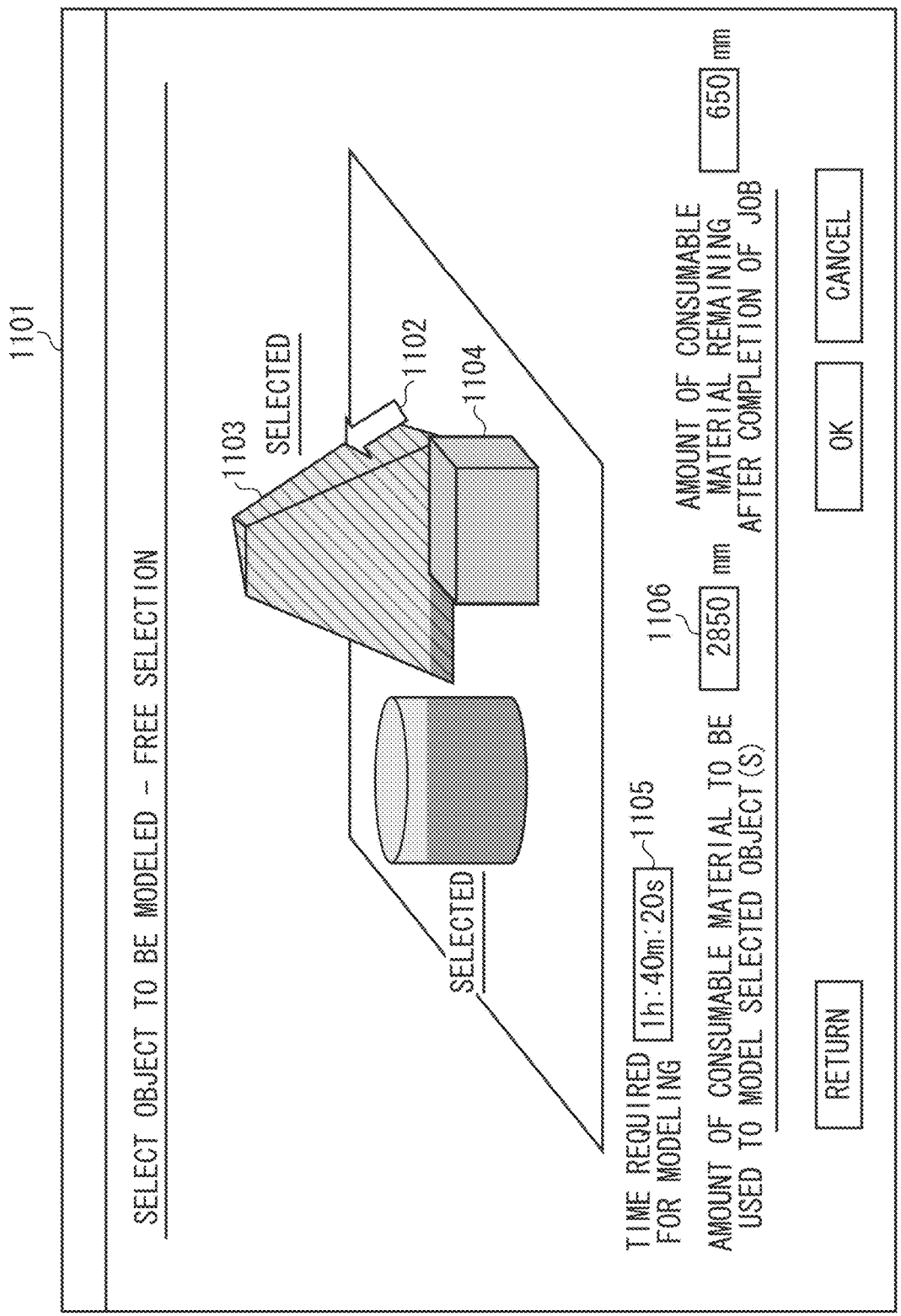
FIG. 11 illustrates an example of a display screen UI for free selection in the designation of an object to be modeled.

FIG. 11 illustrates an example of a display screen UI for free selection in the designation of an object to be modeled. A screen window 1101 is a screen window for selecting an object. A pointer 1102 pointer for specifying a selected area on the screen. An object 1103 is an object being selected. An object can be selected by an operation using an operation interface such as a mouse pointer and a touch panel. Further, the selection may be cleared by re-executing a selection operation. An object 1104 is an object that is not being selected. An item 1105 indicates the time required for the modeling of the selected object. An item 1106 indicates the required amount of consumable material to be used for the modeling of the selected object (s). The user can freely select an object to be modeled preferentially while checking the location and structure of the actual object to be modeled, the amount of consumable material to be used, and the amount of remaining consumable material that remains after the completion of the job, on the modeling simulation screen. Alternatively, another method may be used to select a modeling target object.

In step S746, the job management module 305 calculates and displays the amount of consumable material required for the modeling of the object (s) selected in FIG. 11. The item 1105 indicating the time required for the modeling and the item 1106 indicating the amount of consumable material to be used in FIG. 11 are dynamically updated if a selected object is changed. The user can select one or more objects such that the total required amount of consumable material required for the modeling of the one or more objects is within the amount of consumable material available for use in the modeling. The user can recognize a combination of a plurality of objects that can be modeled using the consumable material available for use.

In step S747, if it is determined that an "OK" button is selected (YES in step S747), the processing proceeds to step S748. In step S748, if it is determined that the modeling of the selected object (s) is possible using the available amount of consumable material (YES in step S748), the processing proceeds to step S749, and the job management module gives the control command generation module 307 an instruction to generate a job of modeling the selected object (s). The generated job is transmitted at a predetermined timing to the 3D printer 102 via the network module 309. The 3D printer 102 executes object modeling according to the job.

In step S750, if it is determined that a "return" button is selected (YES in step S750), the processing proceeds to step S742, and a recommended pattern screen (FIG. 10) is displayed. On the other hand, if the "return" button is not selected in step S750 (NO in step S750), i.e., if a "cancel" button is selected, the job management module 305 does not give an instruction to generate the job, and the processing returns to FIG. 6.

The following is continuation of the description of the flow chart illustrated in FIG. 6.

In step S608, if it is determined that the "continue" button 909 illustrated in FIG. 9 is selected (YES in step S608), the processing proceeds to step S609. On the other hand, if the "continue" button 909 is not selected in step S608 (NO in step S608), i.e., if the "cancel" button 911 is selected, the job management module 305 does not give an instruction to generate the job, and the process illustrated in FIG. 6 is ended.

In step S609, the job management module 305 gives the control command generation module 307 an instruction to generate a job of modeling all the objects. The generated job is transmitted at a predetermined timing to the 3D printer 102 via the network module 309. The 3D printer 102 executes object modeling according to the job. If, for example, the user has a new replaceable cartridge, the user may replace and attach the cartridge and then select the "continue" button 909 so that the modeling is performed. The display of the simulation result illustrated in FIG. 9 is a mere example, and a notification that a shortage of the consumable material will occur may be displayed in any other ways.

Description of the process specified in the flow chart illustrated in FIG. 6 ends here. After the "designate object to be modeled" button 910 is selected, in step S606, the free selection screen illustrated in FIG. 11 may be displayed without displaying the recommended pattern screen illustrated in FIG. 10. Further, if the "cancel" button 1006 is selected in FIG. 10, the modeling may be cancelled, without displaying the screen illustrated in FIG. 11.

The job management module 305 may include a function of transmitting a generated job to the 3D printer 102. The job contains control commands for modeling an object to be modeled. As to a job transmission method, the method described above may be used in which a job is transmitted via the network 101, or a method in which a job is forwarded by serial connection such as a USB may be used. Further, in a case where the 3D printer supports an external memory such as a USB memory, job information may be output to the external memory.

In the present exemplary embodiment, the client application 301 simulates execution of a job in advance so that one or some of modeling target objects can be selected based on the amount of remaining consumable material in the 3D printer 102 and then the modeling of the selected objects is performed.

In the present exemplary embodiment, a plurality of objects contained in a single job may be modeled such that the objects are partially connected to each other, and the modeled objects may then be separated into individual pieces. Examples include parts of a plastic model.

In the first exemplary embodiment, the case is described in which the client application 301 simulates execution of a job in advance and one or some of modeling target objects are designated based on the amount of consumable material in the 3D printer 102 that is available for use.

In a second exemplary embodiment, a case will be described in which a change is made in the modeling settings to model one or some or all of objects within the range of the amount of consumable material available for use. For example, the filling density of one or some or all of objects to be modeled may be reduced, or one or some or all of objects to be modeled may be modeled in reduced size, whereby the amount of consumable material required for the modeling can be reduced. The present exemplary embodiment is applicable to a case where a change in the strength or the size of an object does not cause a significant problem.

Figure 12:
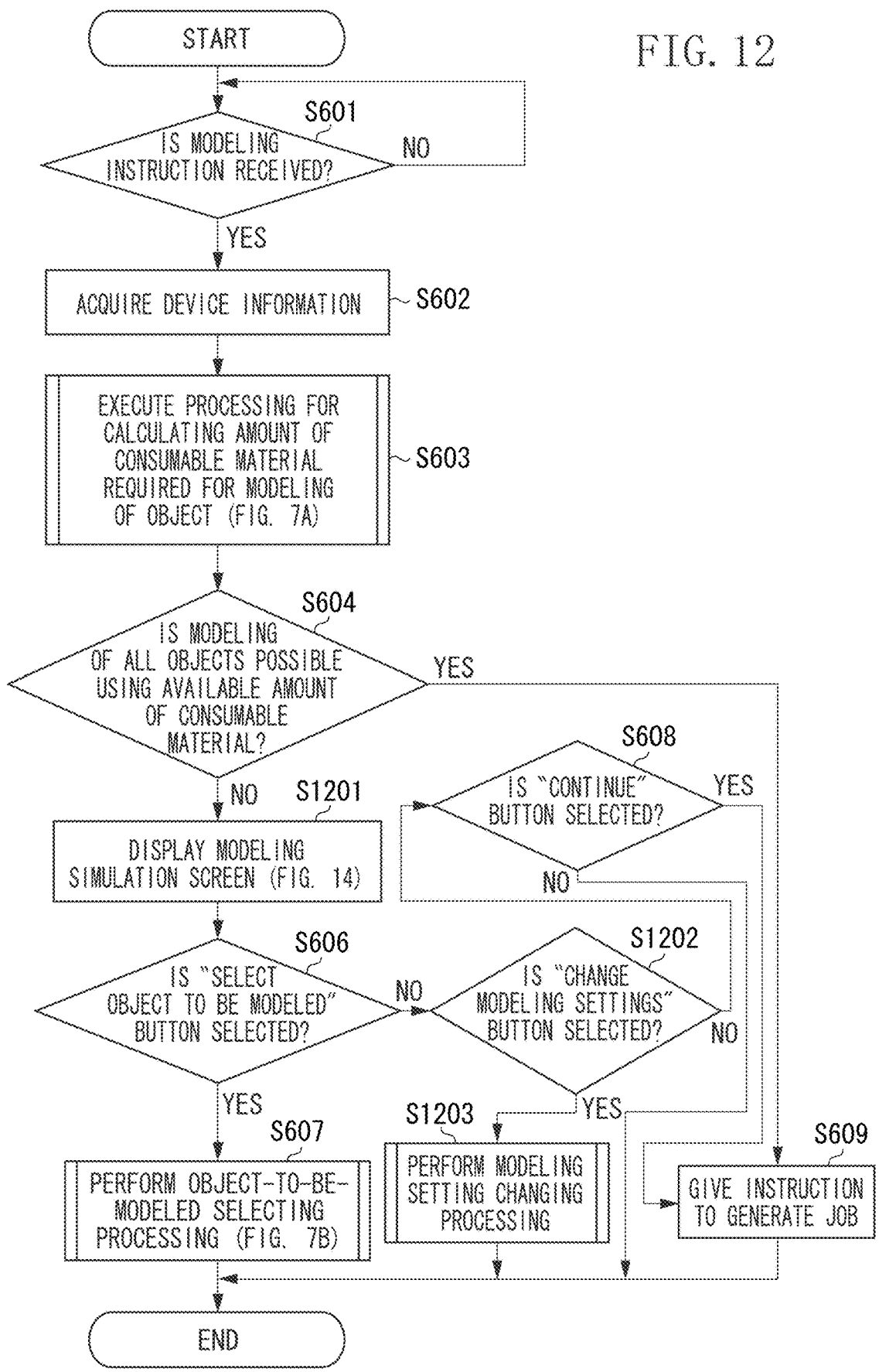
FIG. 12 is a flow chart illustrating a process performed by a client application according to a second exemplary embodiment.

FIG. 12 is a flow chart illustrating a process performed by the client application 301. Steps S601 to S604 and S606 to S609 are similar to those in FIG. 6, so description thereof is omitted.

Figure 14:
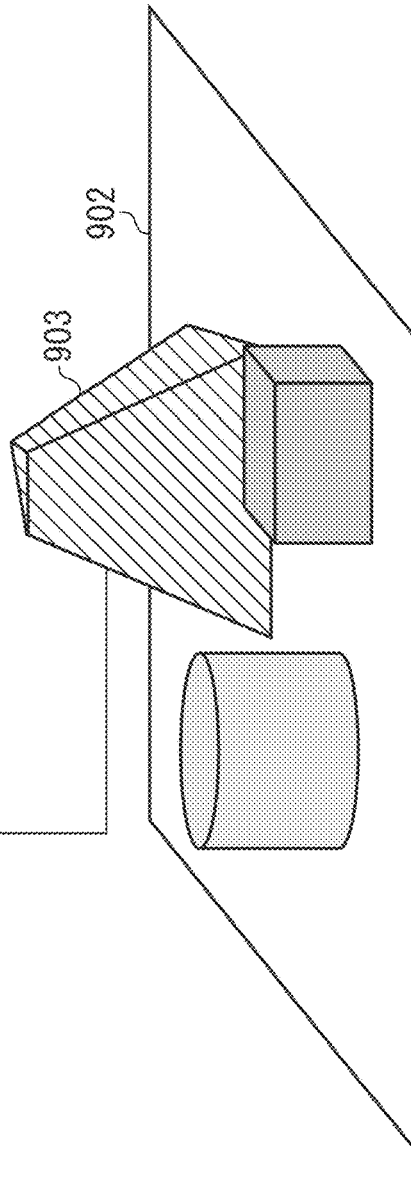
FIG. 14 illustrates an example of a display screen UI for modeling simulation according to a third exemplary embodiment.

In step S1201, a modeling simulation screen illustrated in FIG. 14 is displayed. Compared with FIG. 9, a "change modeling settings" button 1401 is added in FIG. 14. In step S1202, if it is determined that the "change modeling settings" button 1401 is selected (YES in step S1202), the processing proceeds to step S1203.

In step S1203, the job management module 305 and the policy management module 306 perform modeling setting changing processing.

Figure 13:
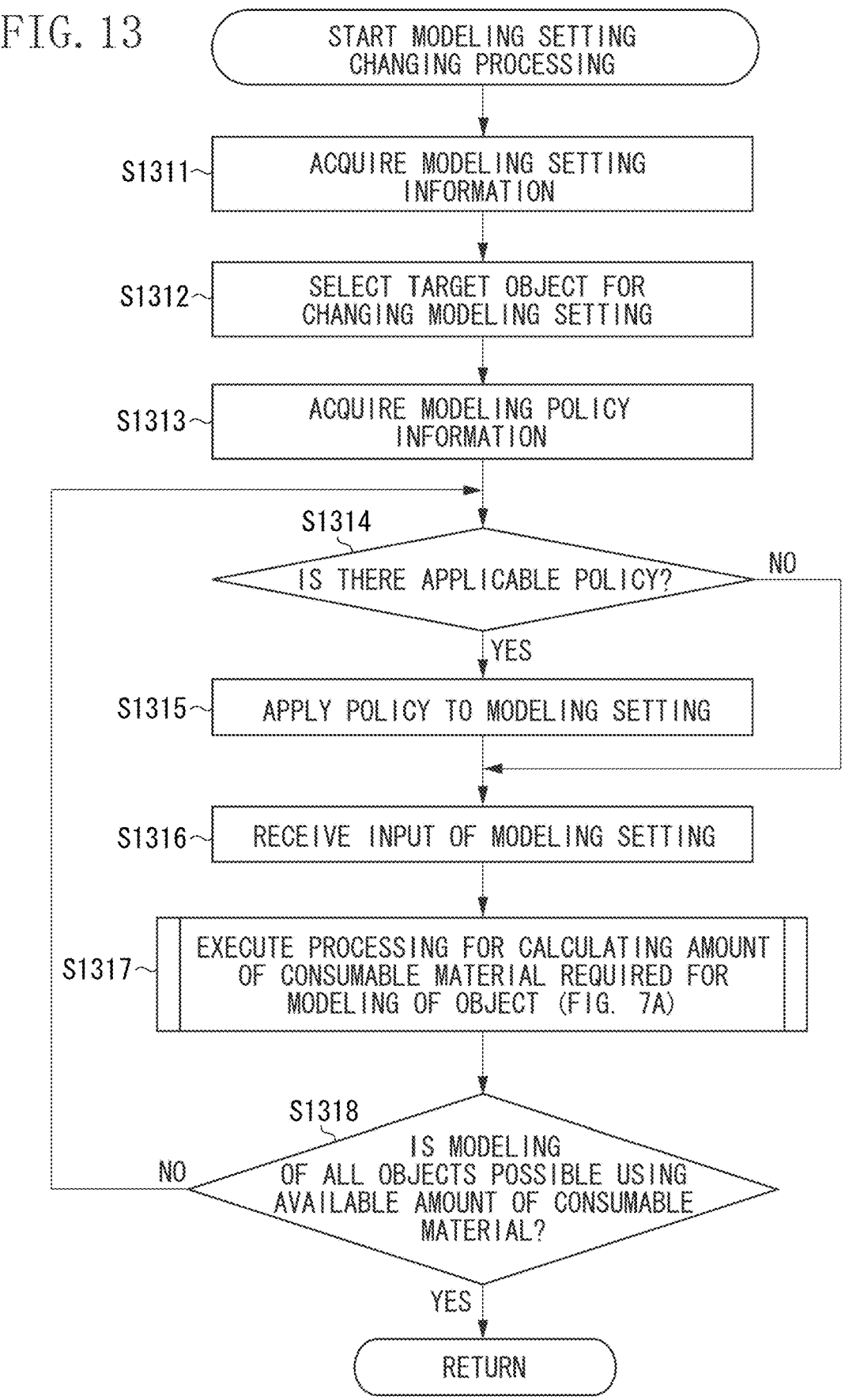
FIG. 13 is a flow chart illustrating an example of a subflow of FIG. 12.

The following describes details of the modeling setting changing processing with reference to a subflow illustrated in FIG. 13. In step S1311, the policy management module 306 acquires modeling setting information about the 3D printer 102 from the modeling setting management table 402 of the data management module 308.

In step S1312, a target object for changing the modeling settings is selected. One or some or all of the plurality of objects may be selected. The user may select an object via the GUI screen, or the client application 301 may randomly select an object.

In step S1313, the policy management module 306 acquires modeling policy information associated with the 3D printer 102 from the policy management table 404 of the data management module 308.

In step S1314, if it is determined that there is an applicable policy in the policies acquired in step S1313 (YES in step S1314), the processing proceeds to step S1315. On the other hand, if it is determined that there is no applicable policy (NO in step S1314), the processing proceeds to step S1316.

In step S1315, the policy management module 306 applies, for example, a policy that is applied at the time of a shortage of the consumable material. When the policy is applied, set values defined in the policy are reflected in the modeling settings of the 3D printer 102.

In step S1316, the job management module 305 receives input of the modeling settings. For example, the user may input the modeling settings via the GUI screen as illustrated in FIG. 8. Not only in the case where the policy is unsuccessfully applied but also in the case where the policy is applied in step S1315, such a GUI screen may be displayed to receive input or change of the modeling settings from the user. In the case where the policy is applied, a screen for confirmation of the modeling settings only may be displayed.

In step S1317, the job management module 305 performs processing for calculating the amount of consumable material required for the modeling of each object (FIG. 7A). Based on control commands generated using the modeling settings set in at least one of steps S1315 and S1316, the required amount of consumable material for each object is calculated.

In step S1318, whether the modeling of all the objects including the object for which the change is made in the modeling settings is possible using the amount of consumable material available for use is determined. If it is determined that the modeling is possible (YES in step S1318), the subflow is ended, and an instruction to generate the job is given in step S609 in FIG. 6. On the other hand, if it is determined that the modeling is impossible (NO in step S1318), the processing returns to step S1314, and the process is continued.

Examples of a change in the modeling settings are as follows.

First, a change can be made in the filling settings of object. For example, the filling density of object is decreased to such an extent that the modeling can be performed within a range of the amount of consumable material in the 3D printer 102 that is available for use. Further, there may be a case where the amount of consumable material for use can be reduced by changing the filling pattern of object. A change may also be made in the filling density and filling pattern of a support, and a change may be made with respect to both the object and the support or with respect to only one of the object and the support. Further, the modeling settings of an object and the modeling settings of a support may be set differently from each other.

Next, a change can be made in the type of consumable material to be used in the modeling of an object. For example, in a case where two types of consumable materials, which are ABS-RED and ABS-BLUE, are set to the 3D printer 102, the consumable material to be used in the modeling of the object may be changed to one of the types of consumable materials that is larger in remaining amount, and then the modeling may be performed.

Further, a change can be made in the object scale. For example, there is a method in which the object scale is decreased to such an extent that the modeling can be performed within a range of the amount of remaining consumable material in the 3D printer 102. For example, modeling of an object at a scale of 90% can reduce the amount of consumable material used in the modeling. The foregoing describes examples of a change in the modeling settings.

Further, in the case of "NO" in step S748 in FIG. 7B, the modeling setting changing processing (FIG. 13) in step S1203 may be executed. Further, the user may freely determine whether to execute the processing of step S1203.

In the present exemplary embodiment, a change is made in the modeling settings so that one or more or all modeling target objects can be modeled by efficiently using the consumable material available for use.

In the first exemplary embodiment, the case has been described in which the client application 301 simulates execution of a job in advance and one or some of modeling target objects are designated based on the amount of consumable material in the 3D printer 102 that is available for use. Further, in the second exemplary embodiment, the case has been described in which a change is made in the modeling settings to model one or some or all of objects within the range of the amount of consumable material available for use.

In a third exemplary embodiment, a case will be described in which another 3D printer capable of executing modeling of an object that is not designated as a modeling target is designated to execute the modeling so that the total modeling time is shortened.

Processing is performed to designate a control apparatus capable of executing modeling of an object that is not designated as a modeling target in the object-to-be-modeled designating processing in FIG. 7B.

Figure 15:
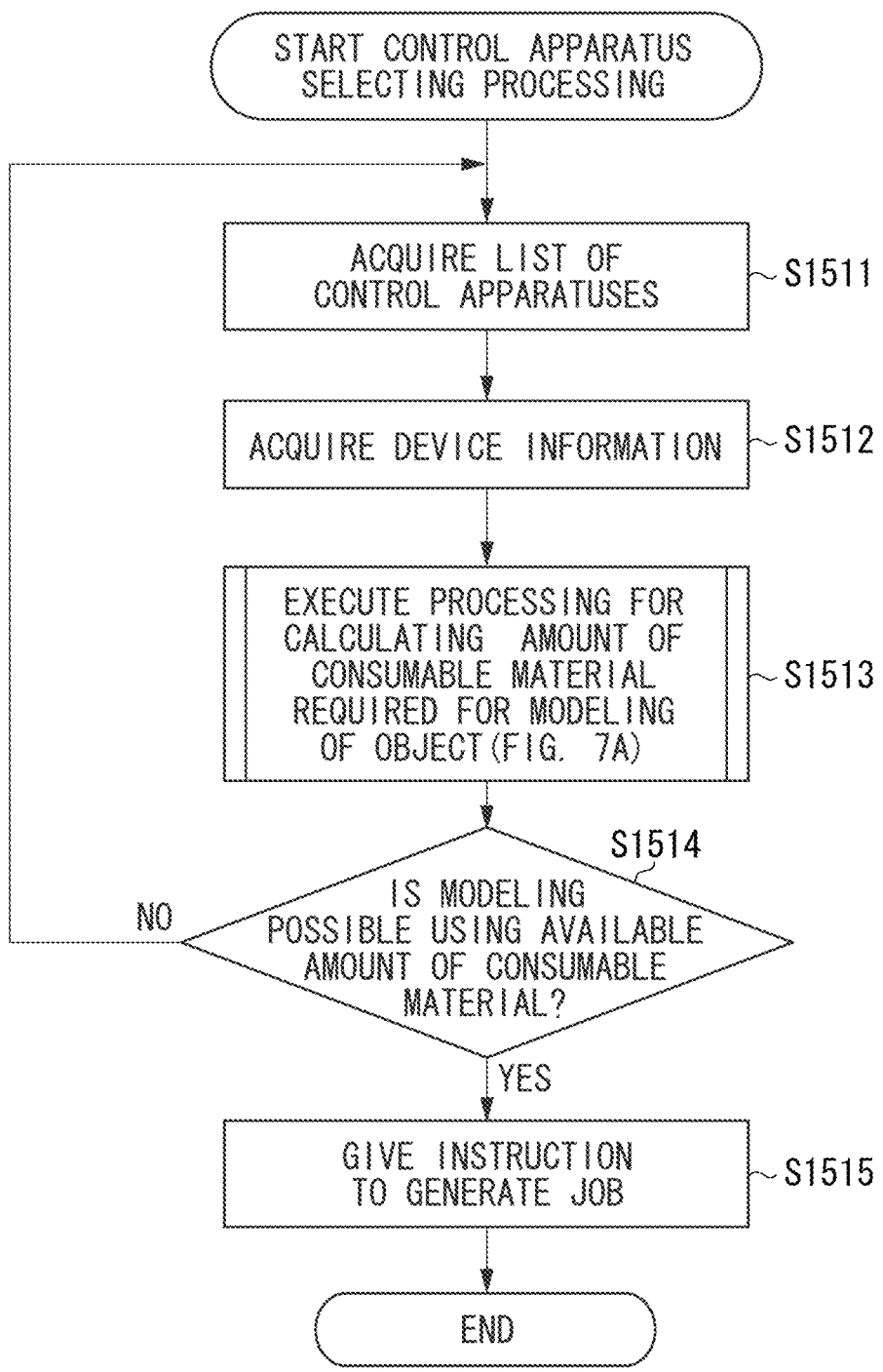
FIG. 15 is a flow chart illustrating an example of a process of designating a control apparatus.

The following describes a process of designating a control apparatus with reference to FIG. 15. This is a process of modeling with another control apparatus an object that is not selected at the time of the display of the screen illustrated in FIG. 11 in step S745 in FIG. 7B. The process is executed, for example, immediately after step S748 in FIG. 7B.

In step S1511, the device management module 304 acquires a list of control apparatuses from the device management table 401 of the data management module 308.

In step S1512, the device management module 304 selects a control apparatus from the list acquired in step S1511 and acquires information about the amount of consumable material available for use from the configuration management module 324 of the 3D printer 102 via the network 101. Alternatively, input of the amount of consumable material available for use in the target 3D printer may be received via the GUI screen.

In step S1513, the job management module 305 calculates the amount of consumable material required for an object that is not designated as a modeling target. The processing for calculating the amount of consumable material required for the modeling of each object in FIG. 7A is executed.

In step S1514, the job management module 305 determines whether the modeling of an object that is not designated as a modeling target is possible using the amount of consumable material available in the 3D printer that is acquired in step S1512. If the job management module 305 determines that the modeling is possible (YES in step S1514), the processing proceeds to step S1515, and a job generation instruction is given. On the other hand, if the job management module 305 determines that the modeling is impossible (NO in step S1514), the processing returns to step S1511, and steps S1512 and S1513 are repeated on another control apparatus.

In the present exemplary embodiment, a 3D printer that is being managed and is capable of executing modeling of an object that is not designated as a modeling target is designated to execute the modeling, whereby the total modeling time can be shortened.

Other Embodiments

Embodiment (s) of the present disclosure can also be realized by a computer of a system or apparatus that reads out and executes computer executable instructions (e.g., one or more programs) recorded on a storage mediums (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM) a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-215217, filed Oct. 30, 2015, which is hereby incorporated by reference herein in its entirety.

What is claimed is:

1. An information processing apparatus comprising:
a memory storing instructions; and
at least one processor executing the instructions causing the information processing apparatus to:
receive a modeling instruction including designation of a plurality of objects as a modeling target to be modeled by a control apparatus and designation of a setting for modeling by the control apparatus, the control apparatus being configured to model a three-dimensional object according to the modeling instruction using a consumable material;
receive an available amount of a consumable material available for use in modeling by the control apparatus;
determine, in a case where a required amount of the consumable material required for the modeling of the plurality of objects by the control apparatus according to the designated setting is larger than the available amount, one or more combinations, wherein each of the combinations consists of a part of objects among the plurality of objects such that the required amount for modeling the part of objects is within the available amount without changing value of setting which is used for calculating an amount of the consumable material and is included in the designated setting, and wherein each of the combinations consists of the part of objects different from that of the other of the combinations, among the plurality of objects;
display, in a case where a plurality of the combinations are determined, the determined combinations in a screen of the information processing apparatus; and
select one or more objects as a modeling target based on one combination designated by a user via the screen of the information processing apparatus from among the determined plurality of combinations.

2. The information processing apparatus according to claim 1, wherein the instructions further cause the information processing apparatus to: calculate, for each of the plurality of objects designated as the modeling target, the required amount of the consumable material required for the modeling by the control apparatus according to the setting, using a control command generated based on the setting and pieces of model data corresponding to the plurality of objects designated as the modeling target.

3. The information processing apparatus according to claim 2, wherein the calculating of the required amount of consumable material includes calculating an amount of consumable material to be used for a support structure modeled as a support in the modeling of an object.

4. The information processing apparatus according to claim 1, wherein one or more objects designated by a user via a screen of the information processing apparatus are selected such that the required amount of the consumable material required for the modeling by the control apparatus according to the setting is within the available amount.

5. The information processing apparatus according to claim 1, wherein an available amount of the consumable material available for use that is acquired from the control apparatus, or an available amount input by a user via a screen of the information processing apparatus is received.

6. The information processing apparatus according to claim 1, wherein the instructions further cause the information processing apparatus to: change the setting for one or more or all of the plurality of objects in the case where:
the plurality of objects is designated as the modeling target to be modeled by the control apparatus,
the setting for the modeling by the control apparatus is designated and
the required amount of the consumable material required for the modeling of the plurality of objects by the control apparatus according to the setting is larger than the received available amount.

7. The information processing apparatus according to claim 6, wherein at least one of a shape of an internal structure of an object, a filling density of the internal structure of the object, a shape of an internal structure of a support structure modeled as a support in the modeling of the object, a filling density of the internal structure of the support, and a color of the consumable material to be used in the modeling is selected.

8. The information processing apparatus according to claim 1, wherein the instructions further cause the information processing apparatus to: designate another control apparatus capable of modeling an object that is not selected, among the plurality of objects.

9. The information processing apparatus according to claim 1, wherein the instructions further cause the information processing apparatus to: transmit to the control apparatus a control command generated according to the selection.

10. The information processing apparatus according to claim 1, wherein the setting is a filling density of object, a filling pattern and a scale.

* * * * *